(12) United States Patent
Martin et al.

(10) Patent No.: US 9,091,704 B2
(45) Date of Patent: Jul. 28, 2015

(54) METHOD FOR CONTROLLING A SCANNING MICROSCOPE

(71) Applicant: UNIVERSIDAD AUTONOMA DE MADRID, Madrid (ES)

(72) Inventors: David Martinez Martin, Madrid (ES); Miriam Jaafar Ruiz-Castellanos, Madrid (ES); Julio Gomez Herrero, Madrid (ES)

(73) Assignee: UNIVERSIDAD AUTONOMA DE MADRID (ES)

( * ) Notice: Subject to any disclaimer, the term of this patent is extended or adjusted under 35 U.S.C. 154(b) by 0 days.

(21) Appl. No.: 14/350,400

(22) PCT Filed: Oct. 10, 2012

(86) PCT No.: PCT/ES2012/070703
§ 371 (c)(1),
(2) Date: Jul. 7, 2014

(87) PCT Pub. No.: WO2013/053968
PCT Pub. Date: Apr. 18, 2013

(65) Prior Publication Data
US 2014/0317789 A1    Oct. 23, 2014

(30) Foreign Application Priority Data
Oct. 10, 2011   (ES) .................................. 201131624

(51) Int. Cl.
*G01Q 20/04*   (2010.01)
*G01Q 10/04*   (2010.01)
(Continued)

(52) U.S. Cl.
CPC ................ *G01Q 10/04* (2013.01); *G01Q 60/08* (2013.01); *G01Q 60/30* (2013.01); *G01Q 60/34* (2013.01); *B82Y 35/00* (2013.01)

(58) Field of Classification Search
CPC ....... C01Q 10/00; G01Q 10/00; G01Q 10/04; G01Q 10/06; G01Q 20/00; G01Q 20/02; G01Q 20/04; G01Q 40/00; G01Q 40/02
USPC .......... 850/1, 2, 3, 4, 5, 6, 7, 19, 20; 250/306, 250/307, 309, 310, 311
See application file for complete search history.

(56) References Cited

U.S. PATENT DOCUMENTS 5,631,410 A     5/1997  Kitamura
8,443,461 B2 *  5/2013  Ohnesorge ...................... 850/33
(Continued)

FOREIGN PATENT DOCUMENTS

JP   2003185556 A   7/2003
JP   2004226238 A   8/2004
WO   00/58759 A2    10/2000

OTHER PUBLICATIONS

PCT/ES2012/070703—International File Date: Oct. 10, 2012—International Search Report; Universidad Autonoma De Madrid; 6 pgs.

(Continued)

*Primary Examiner* — Nicole Ippolito
(74) *Attorney, Agent, or Firm* — Schmeiser, Olsen & Watts LLP

(57) ABSTRACT

The invention relates to a control method having at least two control loops for a scanning microscope provided with a microlever and an actuator suitable for energizing the microlever, in which a first loop maintains as a controlled variable the oscillation amplitude of the microlever and as a manipulated variable the amplitude of the electric signal supplied to the actuator, and a second loop uses as a controlled variable the amplitude of the aforementioned electric signal and as a manipulated variable the tip-sample distance. Said procedure makes it possible to ignore changes of sign in the tip-sample interaction.

6 Claims, 4 Drawing Sheets

(51) Int. Cl.
*G01Q 60/08* (2010.01)
*G01Q 60/30* (2010.01)
*G01Q 60/34* (2010.01)
*B82Y 35/00* (2011.01)

(56) References Cited

U.S. PATENT DOCUMENTS

| | | | |
|---|---|---|---|
| 2002/0062684 A1* | 5/2002 | Adderton et al. | 73/105 |
| 2003/0137216 A1 | 7/2003 | Tamayo De Miguel et al. | |
| 2009/0013770 A1* | 1/2009 | Proksch et al. | 73/105 |
| 2009/0139315 A1 | 6/2009 | Wang et al. | |
| 2009/0307809 A1 | 12/2009 | Ziegler et al. | |
| 2012/0304342 A1 | 11/2012 | Cnrs et al. | |

OTHER PUBLICATIONS

Albrecht, T.R., et al, "Frequency-Modulation Detection Using High-Q Cantilevers for Enhanced Force Microscope Sensitivity", Journal of Applied Physics, 1991, 69(2): pp. 668-673.

S.P. Jarvis, et al. "Normal and Lateral Force Investigation Using Magnetically Activated Force Sensors," Applied Surface Science, vol. 157, 2000, pp. 314-319; 6 pages.

Michael J. Higgins, et al. "Frequency Modulation Atomic Force Microscopy: A dynamic Measurement Technique for Biological Systems," Nanotechnology, vol. 16, 2005, pp. S85-S89; 5 pages.

\* cited by examiner

METHOD FOR CONTROLLING A SCANNING MICROSCOPE

FIELD OF TECHNOLOGY

The invention falls within the field of atomic force microscopes. In particular, it relates to a method for controlling a scanning microscope.

BACKGROUND

The atomic force microscope (AFM) is one of the most versatile tools in the exploration and manipulation of micrometric and nanometric-sized systems. Since its invention in the 1980's, this technique has continued improving to the point where it has conquered practically all working environments—from systems that operate under ultra-high vacuum (UHV) conditions to those that are immersed in a liquid medium via, of course, the customary atmospheric conditions in which we ourselves live.

The AFM is based on a micro-lever that acts as a probe. This micro-lever, arranged in a cantilevered manner, in other words with one end fixed and the other one free, has a very sharp tip at its free end. The operation of this tool is based on making the tip of the micro-cantilever interact with the sample or system being studied. Said interaction causes changes in some observable characteristics of the micro-cantilever, these being finally translated into changes in the position of the same. A fundamental part of the AFM is therefore the micro-cantilever position detection system. The measurement of the micro-cantilever's position is generally taken by means of an optical system comprising a laser light beam suitably focused on the free end of the micro-cantilever. The changes in position of said micro-cantilever then produce changes in the direction of the reflected laser light beam, which is picked up by a photodiode.

The contact working mode involves directly supporting the micro-cantilever on the sample being studied, as if it were a profilometer, bringing it into proximity with and drawing it away from the sample, in order to keep the position of the micro-cantilever constant during the relative displacement of the tip on the sample. This method of working is obviously highly invasive due to the direct tip-sample contact, which means that it can only be used on relatively hard, rigid samples in which the forces applied do not constitute a problem.

In order to avoid the disadvantages of the contact mode, the idea emerged of eliminating direct contact between the tip and the sample. The method of avoiding this contact involves making the micro-cantilever oscillate with a sinusoidal movement of one or more simultaneous frequencies.

Said movement is characterized by its oscillation amplitude and frequency, which can be determined by measuring the changes in position of the micro-cantilever over time. Without there being any need to make direct contact in this case, the tip-sample interaction alters the oscillation frequency and amplitude.

In the publication by Albrecht, T. R., et al, *"Frequency-Modulation Detection Using High-Q Cantilevers for Enhanced Force Microscope Sensitivity"*, Journal of Applied Physics, 1991, 69(2): p 668-673, frequency is taken as the control condition while maintaining a fixed value for the oscillation amplitude. This method (referred to as Frequency Modulation or FM) is far more sophisticated than the previous one, requiring a far more powerful control electronics, as well as extensive experience on the part of the user in order to operate it. Making significant changes in the operating conditions allows work to be carried out in different environments.

The main problem associated with the FM method is the possible loss of control of the AFM due to changes in sign in the interaction. The tip-sample interaction curve in FIG. 1 (canonical curve when work is carried out in air or in a vacuum) illustrates the reason for this loss of control. As we can see in FIGS. 2a and 2b, there are two regions differentiated by a change of sign in the slope which reflects both increasing and reducing behaviour in the change in frequency as the tip approaches the sample. The problem originates in the need to indicate to the feedback system an agreement for altering the manipulated variable. For example, this agreement may be as follows "an increase in the controlled variable is corrected with an increase in the manipulated variable". In this way, the feedback system will work correctly in the region of the curve where this behaviour is established, but will lose control if for some reason it is situated in another region. Due to disturbances (mechanical noise, electrical noise, etc.) it is very common for the domain that does not satisfy the control condition to be entered, thereby destabilizing the microscope. The above problem does not mean that the microscope only has access to the domain that does not satisfy this agreement simply by multiplying the signal from the controlled variable by −1, bearing in mind that in this case the other domain will remain out of the control of the feedback loop, without having to state the interaction domain (attractive or repellent) in which work is to be carried out before putting it into operation. Given an agreement for our feedback system, we are able to work using the repellent domain. In liquid media, unlike in a vacuum or in air, the attractive interaction is very small or virtually negligible, as a result of the screening of the van der Waals forces that occur when the micro-cantilever is completely surrounded by molecules of the liquid medium. However, the screening of van der Waals forces in liquids does not mean that long-range interactions cannot appear in these conditions. It is fairly common that when a surface is immersed in a liquid, it is often charged due to the presence of functional ionized groups on the surface and/or the adsorption of ions present in the liquid solution. As a result, this charge present on the surface electrically attracts counterions in the solution, giving rise to the formation of a double electrical layer. The tip of the micro-cantilever in liquids may also appear surrounded by a double electrical layer. The interaction of both double-layer structures, as the tip-sample distance diminishes, results in a local electrical force which may complicate interpretation hugely.

On the other hand, the considerable reduction in the attractive range in liquids is not always certain, since on a multitude of occasions attractive interactions appear between the tip and the sample as a result of the capture of unwanted material by the tip, coming from the sample itself or from the liquid medium. Hence, there may be a destabilization of the feedback loop that controls the tip-sample distance.

SUMMARY

The present invention involves a new operating method which is simpler and easier to automate and which eliminates the problems described above and is capable of working in all environments in a stable and robust manner. Likewise, the invention makes it possible to obtain data on the magnetic and electrical properties of the systems being studied extremely easily. For this purpose, it proposes a control method of at least two loops for a scanning microscope provided with a micro-cantilever and an actuator adapted to excite the micro-cantilever, in which a first loop has the oscillation amplitude of the micro-cantilever as the controlled variable and the amplitude of the electrical signal introduced into the actuator as the manipulated variable and a second loop uses the amplitude of the previous electrical signal as the controlled variable and the tip-sample distance as the manipulated variable. The amplitude preferably falls within the range of 0.01 nm to 1000 nm. Optionally, a third control loop is provided which has the excitation frequency as the manipulated variable and the movement phase of the lever as the controlled variable. Another fourth optional control loop would have the movement amplitude of the micro-cantilever as the controlled variable and the potential of the continuous component when an electrical potential is applied to it as the manipulated variable.

The problem of the loss of control using FM is resolved using the proposed technique, since the excitation signal amplitude does not present these slope change problems. The proposed control method can be used both in cantilever-type probes and also in tuning fork-type probes.

BRIEF DESCRIPTION

In order to aid understanding of the characteristics of the invention according to a preferred exemplary embodiment of the same, the following description of a set of drawings is provided in which the following has been represented by way of illustration:

DETAILED DESCRIPTION

Figure 3:
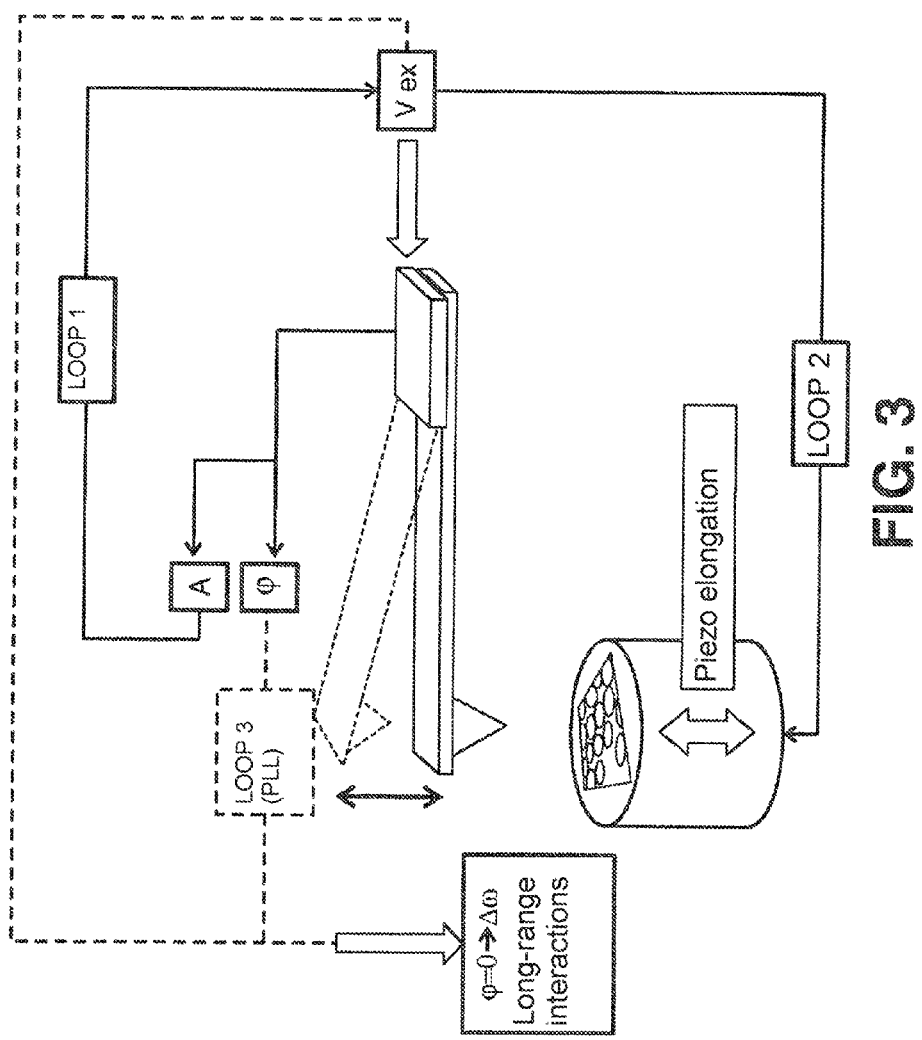
FIG. 3 shows a schematic representation of the invention.

The control method in the present invention uses two feedback loops. The first loop is responsible for keeping the oscillation amplitude of the micro-cantilever constant at all times (this falls within a range of 0.01 nm to 1000 nm) and for this purpose it uses the amplitude of the electrical signal introduced into the piezoelectric actuator which excites the micro-cantilever as the manipulated variable. The second loop has as the controlled variable the manipulated variable of the above, in other words, the amplitude of the excitation signal. The second loop uses the tip-sample distance as the manipulated variable. In this way, the output of this second loop reproduces the topography of the study sample (FIG. 3).

Figure 1:
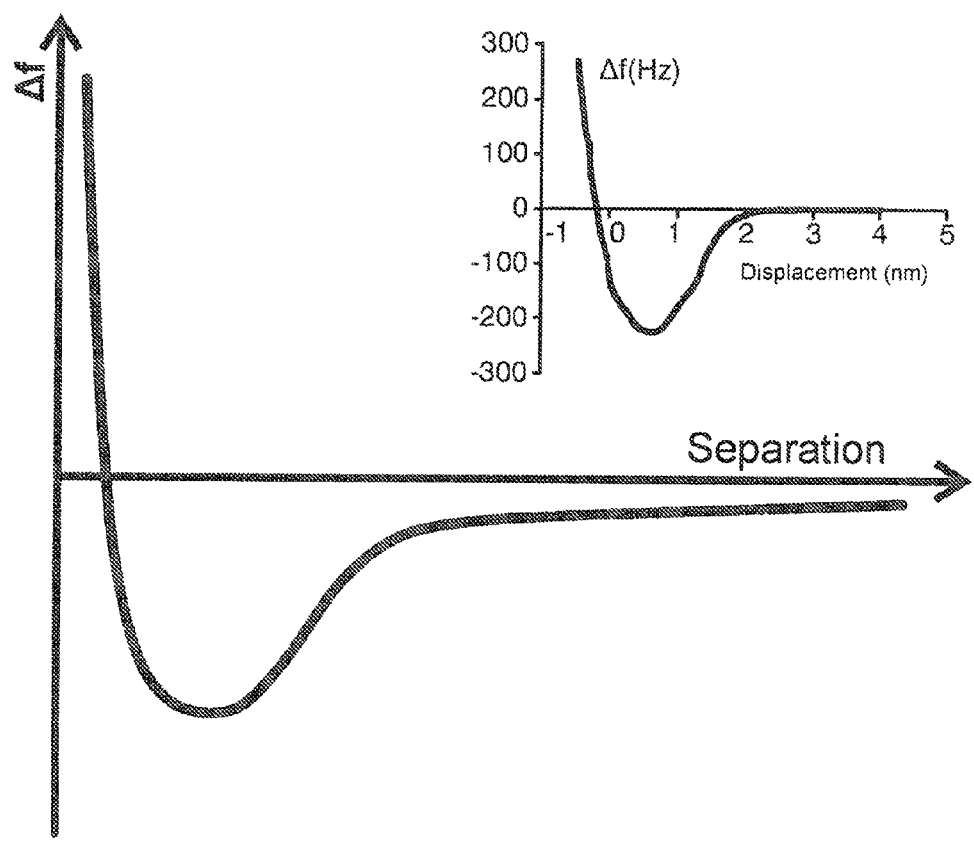
FIG. 1 shows the canonical tip-sample interaction curve when work is carried out in air or in a vacuum.
Figure 2A:
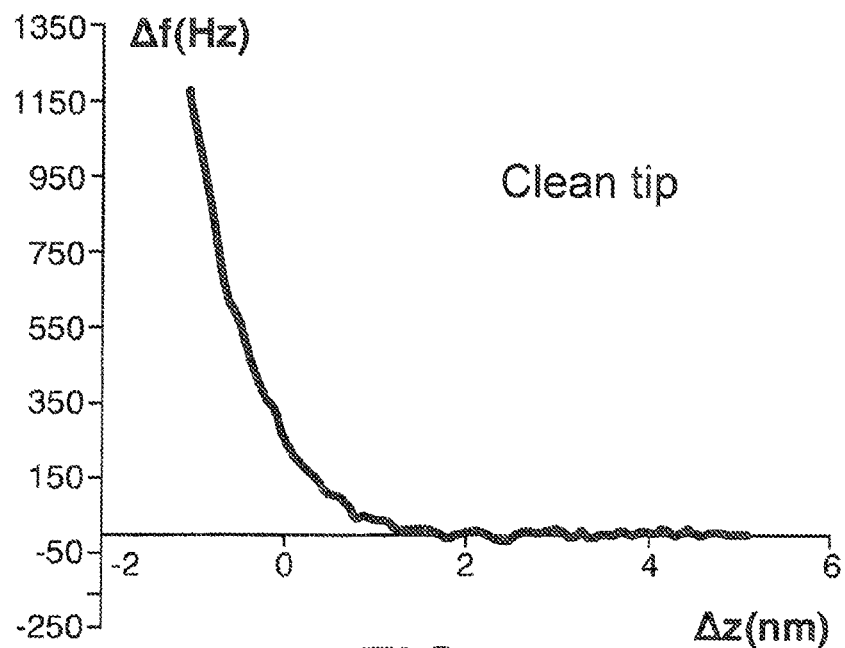
FIGS. 2a and 2b show two graphs illustrating the slope change in the earlier curve in the different working regions (attractive or repellent domain)
Figure 2B:
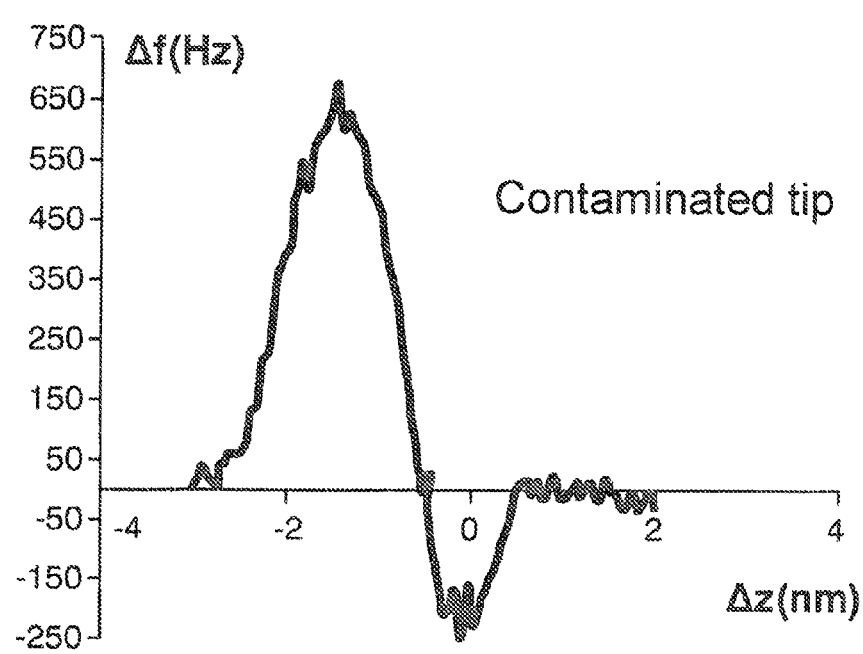

In a particular embodiment, a third feedback loop (loop 3) is included which allows the improvement in the image quality when the samples exhibit electrical and/or magnetic interactions to be increased. This feedback system is a phase-locked loop (PPL), which is responsible for altering the excitation frequency of the micro-cantilever, so that it always oscillates at the resonance frequency (the resonance frequency of the micro-cantilever changes due to the tip-sample interaction). As a controlled variable, the loop 3 picks up the phase shift between the excitation signal of the micro-cantilever and the movement thereof (FIG. 2). The manipulated variable of the this loop provides us with a measure of the electrical and/or magnetic interactions present in the sample, in other words it allows us to perform along with image acquisition, both electrical force microscopy (EFM) and magnetic force microscopy (MFM).

In the event that the samples exhibit both types of interaction (electrical and magnetic), a fourth feedback loop can also be incorporated in an easy and stable manner, which loop allows Kelvin probe force microscopy (KPFM) to be performed simultaneously with MFM and image microscopy. In order to make this fourth link act as a Kelvin probe microscope, it is necessary to apply an electric potential to the micro-cantilever. This potential has two components—one alternating at a given frequency (referred to as f) and a continuous component (zero frequency). As a result, an electrical force will appear between the micro-cantilever and the sample. The fourth feedback loop is responsible for minimizing said electrical force by finding the electrical potential on the sample surface. The fourth loop therefore has the movement amplitude of the micro-cantilever with a frequency f as an input variable and the potential of the continuous component applied to the micro-cantilever as a manipulated variable. This loop alters the potential of the continuous component, even cancelling the amplitude of the micro-cantilever movement at frequency f. In this way, the manipulated variable of this loop directly determines the electrical interactions between the micro-cantilever and the sample, the loop 3 provides data on the magnetic interaction and the rest of the loops provide us with topographical information on the sample.

The applications of the invention are directed at the precise, simple and stable control of an atomic force microscope in all working environments: vacuum, ambient atmosphere and liquids. Likewise, this new method of operation can be combined with other existing techniques, in order to measure long-range interactions, such as electrical and magnetic applications interactions, advantageously.

Two relevant examples using this procedure are the following:

1. Measurement of technologically relevant samples in a vacuum: The samples which are usually measured in a vacuum are very flat, clean crystals at the atomic level. Although these samples are very interesting from the point of view of fundamental physics, they do not exhibit relevant technological applications. On the contrary, samples of technological interest usually have a lower degree of cleanness and a far greater corrugation.

These two facts make it extremely difficult for stable images to be acquired using existing AFM methods. The invention solves these problems and produces high-resolution, stable images for a wide variety of samples of both fundamental and also technological interest. In particular, the invention has been applied to the measurement of surfaces containing carbon nanotubes with nanolithographic contacts. The process of nanolithography involves the adsorption of polymers which are used as masks. As a result, the surface does not possess the characteristic cleanness level of a monocristal and the use of conventional AFM techniques is extremely difficult. The invention solves this problem.

2. Measurements of biological samples in liquid media. Biology is regarded in many cases as the final frontier of AFM. One of the challenges facing AFM involves visualizing biological samples in physiological conditions in a non-invasive manner, which is commonly required for measurements taken in liquid media. Although there are various methods of operation routinely used in liquids, they have all exhibited problems either in terms of sensitivity, resolution or stability. The invention solves these problems too and allows images of biological material to be obtained with great precision and in a non-invasive manner in physiological conditions. In particular, the invention can be used to obtain virus images in a physiological buffer where other methods present significant limitations.

The disposed feedback loops bring about a great reduction in the transients required to control the oscillation amplitude. This fact is above all crucial for working in vacuum conditions. Moreover, the input variable of loop 2 is very robust when confronted with instabilities typical of this kind of microscope (mechanical vibrations at the workplace, electromagnetic noise, impurities in the working liquids, etc.), which makes it possible to acquire images in a repeatable and reproducible manner. These improvements are moreover translated into an increase in image acquisition speed compared with conventional methods. The magnitudes used in feedback loops are highly sensitive to the tip-sample interaction. This fact allows the microscope incorporated in the invention to work with very small applied forces in the order of 40 pN (approximately half the forces holding together the sub-units making up a protein) and therefore in a non-invasive manner. Experiments have been conducted using micro-cantilevers with an elastic constant of 0.6 N/m, 2 N/m and 40 N/m, high-quality images being obtained of the viruses Phi 29 and MVM (the smallest known) in a liquid medium. The possibility of this new technique using any micro-cantilever is also translated into a highly significant increase in resolution in measuring forces, a critical fact when it comes to determining the mechanical properties of the study samples.

Figure 4:
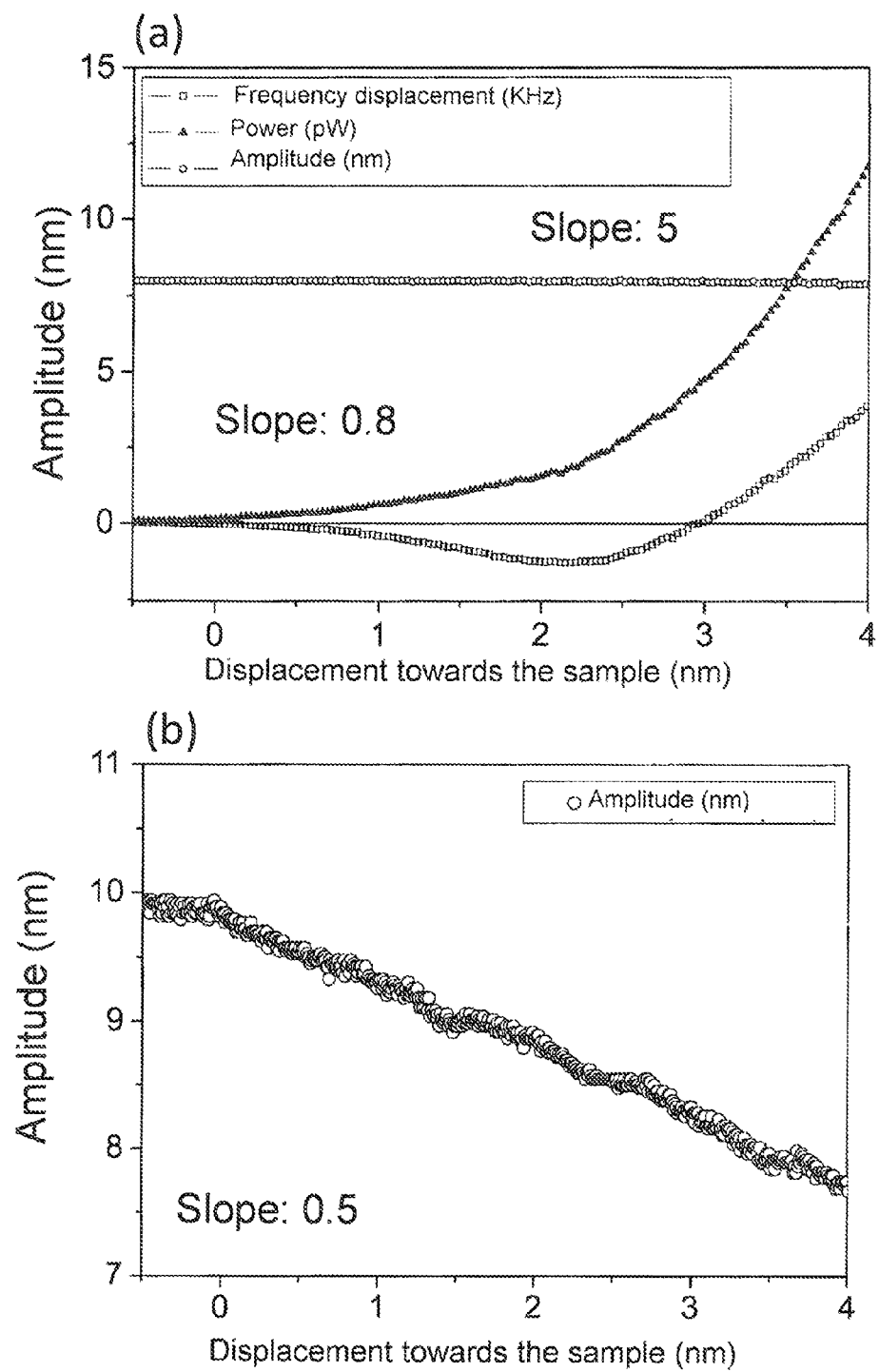
FIG. 4a is a representation of the dependence of different control variables with the tip-sample distance when the method in the invention is used.
FIG. 4b is a representation of the dependence of the amplitude with the tip-sample distance when a method is used according to the earlier technique.

Something worth emphasizing is the ability of the new tool to obtain images with a genuine atomic resolution when working in a liquid medium. By means of FIGS. 4a and 4b, the dependence with the tip-sample distance of the amplitude can be compared. FIG. 4b shows this dependence during the collection of data using a method according to the prior art. FIG. 4a shows the dependence of the excitation amplitude with the tip-sample distance when the procedure in the invention is put into practice. As can be seen, the variation in the controlled variable with regard to the variation in distance (slope of the curve) is greater when the method in the invention is used, which increases sensitivity from a control point of view. It is worth bearing in mind that the units of the controlled variable in the new invention differ from the units of the controlled variable in the already established procedures, as said variables correspond to physically different magnitudes, which makes a more direct comparison difficult. The dependence with the distance of the magnitudes represented is far greater if the method forming the object of the invention (FIG. 4a) is used, which is translated into greater sensitivity. The difference in scales on the X-axis should be noted when we work in the new mode relative to the amplitude modulation mode. It is also important to note that the origin of the X-axis in FIGS. 4a and 4b has been chosen arbitrarily, since its position is not relevant to the evaluation of the magnitudes.

The invention claimed is:

1. A method of control consisting of two control loops for a scanning microscope provided with a micro-cantilever and an actuator adapted to excite the micro-cantilever, wherein the two control loops include a first loop having an oscillation amplitude of the micro-cantilever as a controlled variable and an amplitude of an electrical signal introduced into the actuator as a manipulated variable, and a second loop that uses the amplitude of the previous electrical signal as the controlled variable and a tip-sample distance as the manipulated variable.

2. The method according to claim 1, wherein the amplitude falls within the range of 0.01 nm to 1000 nm.

3. A method of control for a scanning microscope provided with a micro-cantilever and an actuator adapted to excite the micro-cantilever, wherein a first loop has an oscillation amplitude of the micro-cantilever as a controlled variable and an amplitude of an electrical signal introduced into the actuator as a manipulated variable, and a second loop that uses the amplitude of the previous electrical signal as the controlled variable and a tip-sample distance as the manipulated variable;
wherein a third control loop is provided in which the excitation frequency is the manipulated variable and the movement phase is the controlled variable;
wherein an electrical potential is applied to the micro-cantilever, the electrical potential having two components, one alternating at a given frequency and one continuous, further wherein a fourth control loop is provided, the controlled variable of which is the movement amplitude of the micro-cantilever at the given frequency and the potential of the continuous component is the manipulated variable.

4. The method according to claim 3, wherein the amplitude falls within the range of 0.01 nm to 1000 nm.

5. A method of control for a scanning microscope provided with a micro-cantilever and an actuator adapted to excite the micro-cantilever, wherein a first loop has an oscillation amplitude of the micro-cantilever as a controlled variable and an amplitude of an electrical signal introduced into the actuator as a manipulated variable, and a second loop that uses the amplitude of the previous electrical signal as the controlled variable and a tip-sample distance as the manipulated variable;
wherein an electrical potential is applied to the micro-cantilever, said electrical potential having two components, one alternating at a given frequency and one continuous, further wherein an additional control loop is provided, the controlled variable of which is the movement amplitude of the micro-cantilever at the given frequency and the potential of the continuous component is the manipulated variable.

6. The method according to claim 5, wherein the amplitude falls within the range of 0.01 nm to 1000 nm.

* * * * *